UNITED STATES PATENT OFFICE.

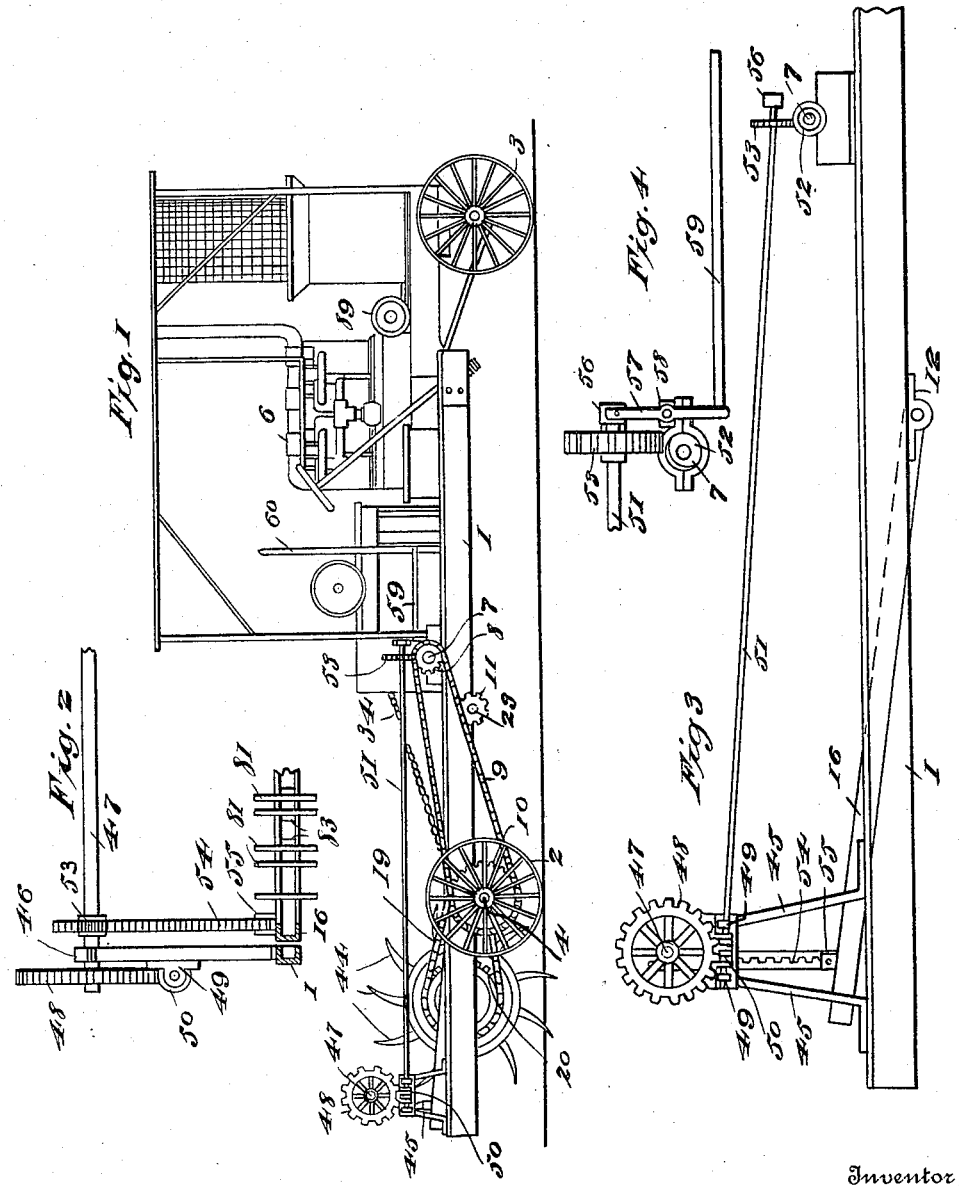

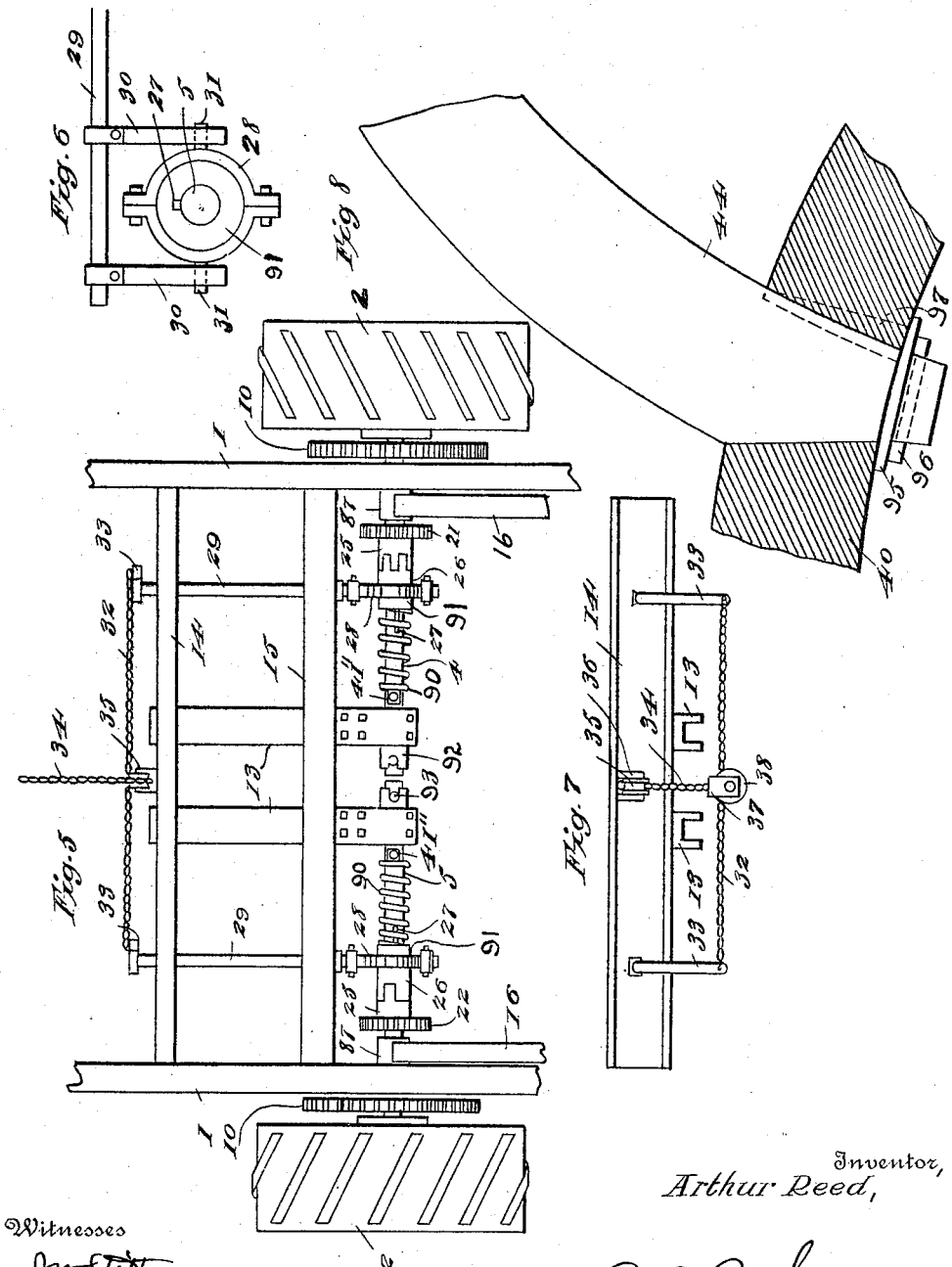

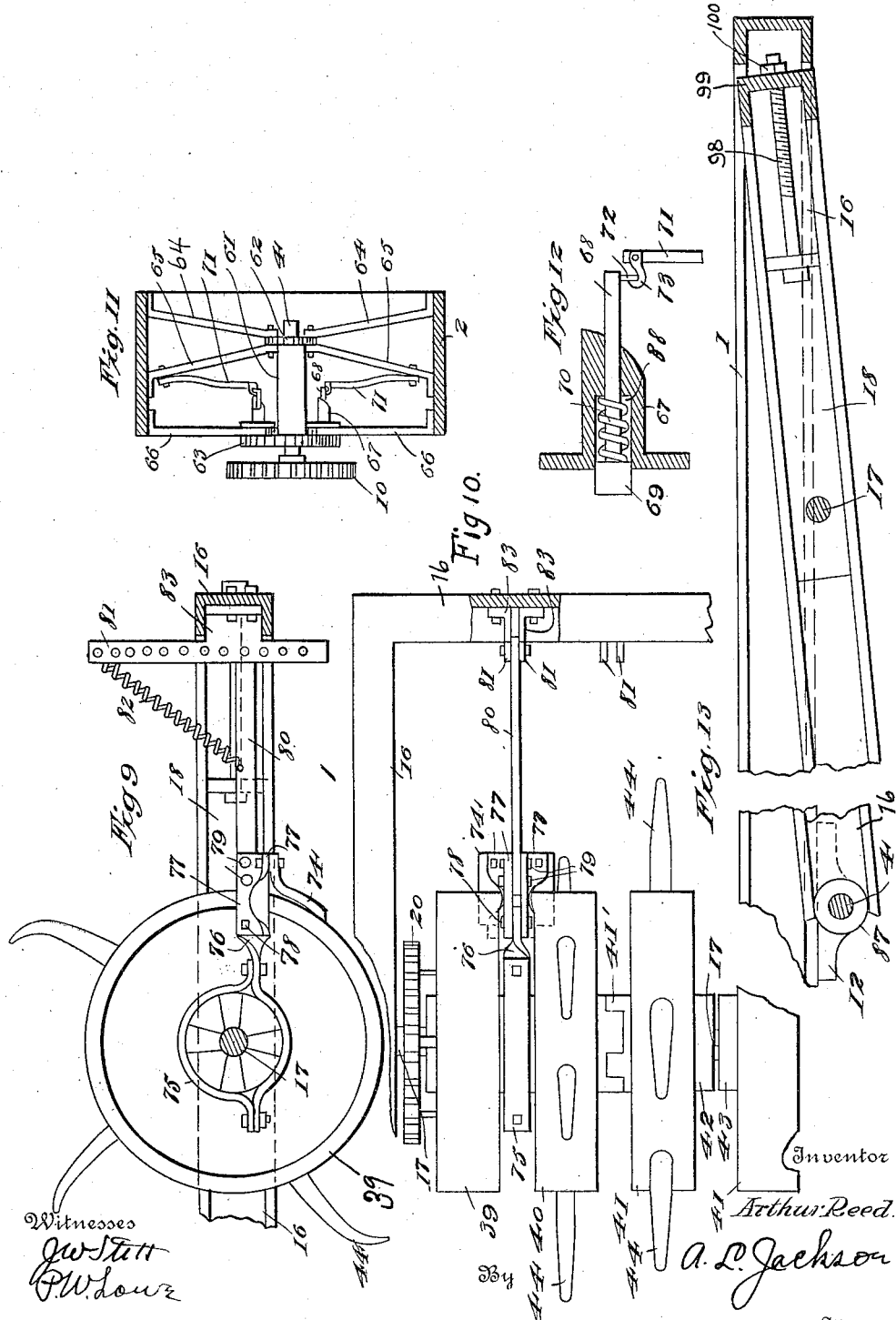

ARTHUR REED, OF FORT WORTH, TEXAS, ASSIGNOR TO BENNETT W. REED, OF FORT WORTH, TEXAS.

LAND-BREAKING PLOW.

1,195,397.  Specification of Letters Patent.  Patented Aug. 22, 1916.

Application filed November 18, 1912. Serial No. 731,951.

*To all whom it may concern:*

Be it known that I, ARTHUR REED, a citizen of the United States, residing at Fort Worth, in the county of Tarrant and State of Texas, have invented certain new and useful Improvements in Land-Breaking Plows, of which the following is a specification.

This invention relates to combined plows and trucks, and more particularly to sub-soil plows, and the object is to provide a sub-soiling device which can be readily attached to and detached from the truck, and which can be used to break the ground to any depth and to any width, according to the size of the machine, in any kind of soil, to a depth of thirty or more inches if necessary in dry or wet weather, and which will not turn the soil up, but break it and leave it practically in the same stratum. The object of this is to prepare the land so that the moisture will go down in the ground and remain there for use in dry weather, instead of running off and being wasted, and also to let the air down deep into the earth, depositing the nitrogen for a plant food.

Another object is to provide drums to which the plows are attached, which will be heavy enough to drive the plows into the ground, and to make the plow the only traction power, the traction power of the entire device being obtained from the turning of the drum with the plows pushing the truck by reason of the resistance offered by the ground in which the plows are running.

Another object is to make a drum in two parts, so that the machine may be turned without lifting the plows out of the ground, and to provide separate driving gear for each part of the drum. While the drum is made in two parts generally, it may be of more than two parts.

Another object is to construct the machine in such manner that the drums with the plows may be readily detached and the device converted into a farm truck.

Other objects and advantages will be fully explained in the following description, and the invention will be more particularly pointed out in the claims.

Reference is had to the accompanying drawings which form a part of this application.

Figure 1 is a side elevation of a complete machine. Fig. 2 is a broken detail view of the drum elevating mechanism. Fig. 3 is a side elevation of the drum elevating mechanism on a larger scale than that shown in Fig. 1. Fig. 4 is an enlarged detail view of the mechanism for starting the operation of the drum elevating mechanism. Fig. 5 is a broken plan view illustrating the gearing for driving the drums, and showing the clutch mechanism in detail. Fig. 6 is a detail view of the clutch operating mechanism. Fig. 7 is a front elevation of a portion of the clutch operating mechanism. Fig. 8 is a broken detail view illustrating the manner of attaching the plows to the drum. Fig. 9 is an enlarged detail view of a section of the drum, showing the scraper and mechanism for operating the scraper. Fig. 10 is a plan view of the mechanism shown in Fig. 9, omitting the spring shown in Fig. 9. Fig. 11 is a section of a truck supporting wheel, showing the means for locking the driving sprocket wheel to the truck wheel. Fig. 12 is an enlarged detail view of one of the locking devices shown in Fig. 11. Fig. 13 is a broken detail view of the truck frame, showing the bearing of the truck frame against the main driving axle, and also showing a sliding bearing which is used for tightening the sprocket chains which drive the drums.

Similar characters of reference are used to indicate the same parts throughout the several views.

The machine is provided with a main rectangular frame 1, which is supported by wheels 2 and 3. This frame 1 may be constructed of angle bars, as illustrated in the drawing. The wheels 2 are mounted on and support the main driving axles 4 and 5. The axles 4 and 5 are journaled in the frame pieces 1, and also in bearings attached to bars 13. The bars 13 are supported by cross bars 14 and 15 which are attached to the bars 1. The machine is driven by a motor 6 which is supported on the frame 1. The motor drives a main driving axle 7 which is provided with sprocket wheels 8. The sprocket wheels 8 drive the sprocket chains 9. It will be understood from Fig. 5 that each side of the machine is equipped with duplicate sprocket chains 9 and sprocket wheels 8 and 10. Sprocket wheels 11 are used for tightening the sprocket chains 9. The sprocket wheels 11 may be provided with a shaft 23 which is journaled in bearings attached to the under side of the frame 1. Bearings 12 are attached to the frame 1 for the axles 4 and 5. A drum frame 16 is mounted within the frame 1 and is simply pivoted against the sleeve 87 of bearing 12, and the shaft 17 is journaled in sliding bearings 18. The bearings 18 lie within the channels of the frame 16 and are movable within the channels of the beam 16. The object in making the bearings 18 slidable is to provide means for tightening sprocket chains 19 which are driven by the sprocket wheels 21 and 22 which are movably mounted on the axles 4 and 5. The bearings 18 are moved by screw bolts 98 which are connected to the bearings 18 and extend through the back end 99 of frame 16 and are provided with nuts 100. The sprocket chains 9 drive the sprocket wheels 10 both for driving the drums (hereinafter described) and for driving the machine when used for a truck or when the machine is to be moved from one place to another. The drums 39, 40, and 41 are driven by a shaft 17 and this shaft is driven by the sprocket wheels 20 which are driven by the sprocket chains 19. The sprocket wheels 21 and 22 are loosely mounted on the axles 4 and 5, respectively, and are locked to these axles for driving purposes by clutches. Each clutch is composed of a jaw 25 which is formed on the hub of the sprocket wheel 21 and also on the sprocket wheel 22. The other jaw 26, which coöperates with the jaw 25, is slidably mounted on its respective axle, and is made to rotate with its axle by a key 27 which is rigid with the respective axle. The movable clutch jaw 26 is actuated by a yoke 28, which is rigidly connected to the clutch 26. The yoke 28 is operated by the rod 29 and hangers 30, which are rigid with the rod 29, and pivotally connected to the yoke 28 by means of studs 31. The hangers 31 are constructed as such hangers are usually constructed, with the lower ends slotted for engaging the studs 31. The rods 29 are actuated by a chain 32 which is connected to cranks 33 formed on the ends of rods 29. The chain 32 is operated by another chain 34 which runs over a pulley 35 mounted on the bar 14 by a hanger 36, and the chain 34 is attached to a hanger 37 which carries a pulley 38. The object of having the wheel 38 to lift the chain 32 is to make the operating chain 34 adjustable relative to the two cranks 33. When a pull is made on the chain 34, the pull will be made equally on the cranks 33, because pulley wheel 38 will move on the chain 32 and be shifted centrally thereon. The clutch jaws 25 and 26 are held normally in mesh by spiral springs 90 which are mounted on the shafts 4 and 5 and bear against the sleeves 91. The springs 90 bear against pins 41″ which are rigid with the shafts 4 and 5. The shafts 4 and 5 are held in operative position by collars 92 and pins 93. A pull on the chain 34 will throw the clutches 25 and 26 out of mesh so that the drums heretofore described will not be driven. This can be done whenever desirable by pulling on the chain 34. When the chain 34 is released, the clutches 25 and 26 will again be thrown in mesh for driving the drums.

The drums for breaking land are preferably made in a plurality of sections 39, 40 and 41, which operate together, and there are two sets of the drums 39, 40 and 41. On one end of the shaft 17, the drums 39, 40 and 41 are driven by a sprocket wheel 20 which is driven by a sprocket chain 19. A duplicate set of drums 39, 40 and 41 are mounted on the other end of the shaft 17. All of the drum sections, 39, 40 and 41 are loosely mounted on the shaft 17. One object in making two sets of drums is to provide that one set may be driven independently of the other set of drums. This is necessary in making turns where it is desirable that the drums continue to break the land. If the drums were not arranged in sections, they would have to be lifted from the ground in order to make turns, but with two independent sections running, the drums can be driven while turns are being made. The shaft 7 is provided with differential gearing for the purpose of driving the shafts 4 and 5 independently of each other. The drum sections 39, 40 and 41 are locked together by having their hubs 41′ dovetailed into each other, as shown in Fig. 10. The hubs 42 and 43 of the drum sections 41, which are adjacent to each other, simply bear against each other without interlocking, as shown in Fig. 10. The hubs 42 and 43 bear against each other so that all of the drum sections will be held in operative relation. The drums are provided with teeth or plows 44, and these plows are preferably curved and made round in cross section. Fig. 8 illustrates the manner of attaching plows to the drum. The plow is tapered at the end and inserted in an opening in the drum. A washer 95 is placed on the shank of the plow, and is held in the drum by a key 96. A key 97 indicated in dotted outline in Fig. 8 prevents the plow from turning in its socket in the hub.

The plows 44 can be made of any suitable length and size desirable. These plows may be made 30 inches long, if necessary to break the land that deep. These plows break the land and loosen it up without turning the land over. The object in such breaking without turning the land over is to retain the moisture in the land and also to provide that moisture and air may go down into the land or soil. When moving from one section of land to another, or from one field to another, the drum frame may be lifted up so that the plows 44 will not touch the ground. The machine can then be driven as any truck.

The means for lifting the drum frame 16 is illustrated in Figs. 1 to 3, inclusive. Standards 45 are attached to the frame 1 and provided with bearings 46 on the upper ends. And a shaft 47 is journaled in the bearings 46 and, worm gear wheels 48 are mounted on the shaft 47. Bearings 49 are attached to the standards 45 and worms 50 are journaled in the bearings 49. The worms 50 are rigid with the shaft 51, a worm 52 is rigid with the shaft 7, and a worm gear wheel 53 is rigid with the shaft 51 and is driven by the worm 52. A rack 54 is pivotally connected with the studs 55 which are rigid with drum frame 16. A pinion 57 is rigid with shaft 47 and drives the rack 54 whenever shaft 47 is driven. Means are provided for driving the shaft 51 whenever necessary. A bearing 56 for the end of the shaft 51 next to the motor is mounted on a lever 57 which is pivotally mounted on fulcrums 58. A bar 59 is pivotally connected to the lever 57 and to a lever 60. The lever 60 may be used to throw the worm gear 53 in or out of mesh with the worm 52 whenever necessary. As soon as the worm gear wheel 53 is thrown in mesh with the worm 52, the shaft 51 will be driven and the rack 54 will move the drum frame 16 vertically. Thus the drum frame can be raised or lowered whenever necessary by a single movement of the lever 60. When the drum frame is lowered, the same operation raises the main frame and the wheels 2 are raised from the ground.

When the machine is plowing, the supporting wheels 2 need not be driven, and they may not even be touching the ground, but the sprocket wheels 10 are necessarily driven for driving axles 4 and 5. The wheels 2 may be loosely mounted on the axles 4 and 5 and may be locked to the sprocket wheels 10 which are rigid with the axles 4 and 5. The wheels 2 are to be used for transporting the truck, as when the machine is to be moved from one place to another without plowing. The wheel 2 is composed of a hub 61 and the rim 2 with spokes 64 and 65 bolted to the annular flange 62 of the sleeve or hub 61, and spokes 66 riveted to the rim 2 and to an annular flange or disk 63 of the hub 61. The means for locking the wheels 62 to the sprocket wheels 10 include bolts 69 and housings 67, which housings are riveted to the annular flange 63. Bolts 69 have stems 68 and the housings 67 are large enough for receiving spiral springs which are mounted on the stems 68. The springs 70 rest against the bolts 69 and against interior shoulders 88 in the housings 67. Normally the springs 70 would thrust the bolts 69 out of the housings 67 for locking the wheels 62 to the sprocket wheels 10, the sprocket wheels 10 having suitable sockets to receive the bolts 69. For drawing the bolts 69 out of sprocket wheels 10 in order to release the wheels 62 from operative or driving position, springs 71 are attached to spokes 65 and are provided with swinging hooks 73 which are adapted to engage pins 72 which are rigid with the stems 68. The springs 71 are stronger than the springs 70 so that when the swinging hooks 73 engage the pins 72 the springs 71 will draw the bolts 69 within the housings 67 and thus hold the wheels 2 out of operative position. When the wheels 2 are to be used for transportation of the machine, the hooks 73 are released from the pins 72. When the machine starts the bolts 69 will be automatically thrust into the sprocket wheels.

Scrapers 74 are provided for cleaning dirt or mud from the peripheries of the drums 39, 40 and 41. Yokes 75 are mounted on the hubs 41' loosely and a shank 76 projects from the yokes 75. Bars 77 are rigidly attached to the shanks 76, and these bars are made angular so that the upright portions of the bars 77 may be attached to the shanks 76 by suitable bolts 78. The scraper 74 is rigidly riveted to the horizontal portions of the bars 77. A bar 80 is caught in between the upright portions of the bars 77. The bar 80 is secured in between the bars 77 by wooden pins 79 or pins which are more easily broken than the bars. The bar 80 is for the purpose of supporting the scraper 74 at the proper height on the drum which it is to scrape. For this reason, the bar 80 is pivotally connected to upright standards 81 which are provided with a plurality of perforations so that the bar 80 may be pivotally connected to the standards at any suitable height. The standards 81 are provided with backwardly projecting flanges 83 which are bent at right angles and riveted to the frame 16, the frame 16 being the drum frame. The object of the wooden pins 79 instead of metal pins is to provide for the release of the bar 80. Should a rock or other obstruction be caught on the scraper 74, the wooden pin 79 would break before any other part of the machinery would break, the scraper would swing on upwardly with the drum without breaking anything, and the bar 80 would simply swing loosely and would fall to the ground. But a spiral spring 82 is connected to the bar 80 and to the upper part of the standards 81 so that in case the wooden pins 79 are broken, the bar 80 would be supported above the ground by the spring 82. It will be observed that the scraper 74 scrapes the edges of two drums. See Fig.

10. The scraper is set forth in the patent issued to me on Oct. 13, 1914, No. 1,113,691.

From this construction of the machine above described it will be seen that the drums can be removed and the machine used for an ordinary truck. The same motor may be used for driving any other machinery by providing the motor with the drive pulley 89.

What I claim, is,—

1. A land breaking machine comprising a wheeled frame and a motor carried thereby, a main axle in two parts journaled on said frame, a drum frame adjustably mounted in said wheeled frame and consisting of two side beams and a cross-beam at the rear end connecting said side beams and the front ends of said beams bearing against the bearings of said main axle, making a pivotal bearing, a drum shaft journaled in said drum frame, two series of drums independent of each other loosely mounted on said drum shaft and plows rigid with each drum, and gearing for driving each series of said drums from each part of the main axle and said gearing being adapted to hold said drum frame in operative relation.

2. A land breaking machine comprising a wheeled frame, a main axle in two parts journaled in said frame, means for driving said axle, a drum frame adjustably mounted in said wheeled frame and consisting of two side beams and a cross-beam connecting the rear ends of said beams and the front ends of said frames being concaved and engaging the bearings of said main axle thereby forming a pivotal bearing for the drum frame, a drum shaft journaled in said drum frame and provided with land breaking plows, and gearing for driving said drums from each part of said main axle and for holding said drum frame in operative relation to said main axle.

3. A land breaking machine comprising a wheeled frame, a main axle and bearings therefor attached to said frame, supporting wheels carrying said main axle, means for driving said main axle, a drum frame adjustably mounted in said frame, a drum shaft journaled in said main frame and consisting of two side beams and a cross beam connecting said side beams at the rear ends and said side beams having the front ends concave and engaging the bearings of said main axle, slidable bearings in said drum frame for said drum shaft, drums on said drum shaft provided with land breaking plows, and gearing for driving said drums from the main shaft and for supporting said drum frame in operative position.

4. A land breaking machine comprising a wheeled frame, a main axle in two parts and bearings therefor attached to said frame, means for driving the two parts of said main axle independently of each other, a drum frame within said main frame, a drum shaft and bearings therefor slidably mounted in said drum frame, means for varying the position of said bearings in said drum frame, a drum shaft journaled in said bearings, drums provided with land breaking plows and loosely mounted on said drum shaft, and gearing for driving said drums from the main axle and for holding said drum frame in operative position.

5. A land breaking machine comprising a wheeled frame, a main axle in two parts and bearings therefor attached to said frame, means for driving the two parts of said axle independently of each other, a drum shaft and bearings therefor, two series of drums mounted on said drum shaft and each series having interlocking hubs, the adjacent hubs of the two series being smooth and bearing against each other to hold the two series in place, plows rigid in said drums, and means for driving each series of drums from each part of said axle independently of the other.

6. A land breaking machine comprising a wheeled frame, a main axle in two parts and bearings therefor attached to said frame, means for driving the two parts of said axle independently of each other, a drum shaft and bearings therefor, two series of drums loosely mounted on said shaft, each series of drums having interlocking hubs spacing the drums apart for scraper attachments, plows rigid in said drums, and independent means for driving each series from said main axle.

7. A land breaking machine comprising a wheeled frame, a main axle in two parts and bearings therefor attached to said frame, independent means for driving each part of said axle, a drum shaft and bearings therefor, means for adjusting said bearings, two series of drums loosely mounted on said drum shaft, a sprocket wheel loosely mounted on said shaft for each series of drums and each sprocket wheel rigid with the drum adjacent to the end of the shaft and the adjacent drums of the two series having the adjacent hubs smooth and spacing the adjacent drums apart, plows in said drums, and independent means for driving each series of drums from said main shaft.

8. A land breaking machine comprising a wheeled frame, a main axle and bearings therefor attached to the wheeled frame, said bearings having inwardly projecting sleeves, a drum frame pivotally mounted against said sleeves at the front end, a drum shaft in said drum frame, two series of drums on said shaft and each drum provided with plows rigid therewith, the drums of each series having interlocking hubs, means for driving said axle and drums, and means for swinging said drum frame vertically whereby said drum shaft may be elevated above the plane of said axle and whereby said drum frame may elevate said axle above the plane of said shaft.

9. A land breaking machine comprising a wheeled frame, a main axle and bearings therefor attached to said wheeled frame and having inwardly projecting sleeves, a frame pivotally mounted against said sleeves, plowing members rotatably mounted in said pivoted frame, means for driving said axle, and gearing for driving said plowing members from said axle and said gearing serving to hold said pivoted frame in operative position.

10. A land breaking machine comprising a wheeled frame, a main axle and bearings therefor attached to said frame and having inwardly projecting sleeves, a frame pivotally mounted against said sleeves, two series of plowing members rotatably mounted in said pivoted frame, means for driving said axle, gearing serving to drive each series of said plowing members from said axle and to hold said pivoted member against said sleeves, and means for swinging said pivoted frame vertically at the rear end whereby said plowing members may be elevated above the ground and whereby said pivoted frame may elevate said wheeled frame to lift the wheels thereof from the ground.

In testimony whereof, I set my hand in the presence of two witnesses, this 4th day of November, 1912.

ARTHUR REED.

Witnesses:
A. L. JACKSON,
P. W. HUNT.

Copies of this patent may be obtained for five cents each, by addressing the "Commissioner of Patents, Washington, D. C."